United States Patent [19]

Heller

[11] Patent Number: 4,528,453
[45] Date of Patent: Jul. 9, 1985

[54] DUAL COLLIMATOR

[75] Inventor: Sherman L. Heller, Ardsley, N.Y.

[73] Assignee: Albert Einstein College of Medicine of Yeshiva University, Bronx, N.Y.

[21] Appl. No.: 403,804

[22] Filed: Jul. 30, 1982

[51] Int. Cl.³ .............................................. G21K 1/02
[52] U.S. Cl. ............................ 250/505.1; 250/363 S
[58] Field of Search ............... 250/505.1, 363 S, 368; 378/148, 147

[56] References Cited

U.S. PATENT DOCUMENTS

| | | | |
|---|---|---|---|
| 3,011,057 | 11/1961 | Anger | 250/366 |
| 3,060,316 | 10/1962 | Peyser | 378/152 |
| 3,238,371 | 3/1966 | Furnas, Jr. | 378/153 |
| 3,710,119 | 1/1973 | Eymery | 378/69 |
| 3,982,133 | 9/1976 | Jupa et al. | 378/148 |
| 4,027,167 | 5/1977 | Pollermann | 378/153 |
| 4,086,494 | 4/1978 | Malak | 378/153 |
| 4,118,632 | 10/1978 | Luig | 250/363 S |
| 4,129,784 | 12/1978 | Tschunt et al. | 378/148 |
| 4,200,803 | 4/1980 | Becker et al. | 378/148 |
| 4,202,612 | 5/1980 | Di Matteo et al. | 353/28 |
| 4,221,971 | 9/1980 | Burger | 378/148 |
| 4,266,135 | 5/1981 | Kuwik et al. | 378/16 |
| 4,266,139 | 5/1981 | Sportelli et al. | 378/147 |
| 4,293,771 | 10/1981 | Lescrenier | 378/206 |
| 4,324,979 | 4/1982 | Bewley et al. | 250/505.1 |

Primary Examiner—Janice A. Howell
Assistant Examiner—Constantine Hannaher

[57] ABSTRACT

A dual collimator designed for an Anger camera (gamma camera), to permit measurement of cardiac performance on a beat-to-beat basis. Special all-purpose (SAP) and special high-sensitivity (SHS) collimator sections can be interchanged without movement of the gamma camera or patient. Thus, left-ventricular regions of interest delineated on SAP multigated images can be transferred to SHS high sensitivity images to generate beat-to-beat volume curves. Preliminary balloon studies demonstrated an excellent correlation between ejection fractions calculated with the two collimators: $5 > 0.99$, $n = 17$, $p < 0.001$. Varying the volume of an adjacent "right ventricle" balloon failed to alter significantly the count rate from the "left ventricle" balloon's region of interest. Preliminary results on 12 patients, comparing standard-camera ejection fractions with average beat-to-beat ejection fractions, showed that it is possible to measure cardiac function on a beat-to-beat basis with a single-crystal gamma camera. There was minimal difference between the ejection fractions calculated by the dual-collimator method and a standard gated technique ($r = 0.98$, $n = 12$, $p < 0.001$).

4 Claims, 7 Drawing Figures

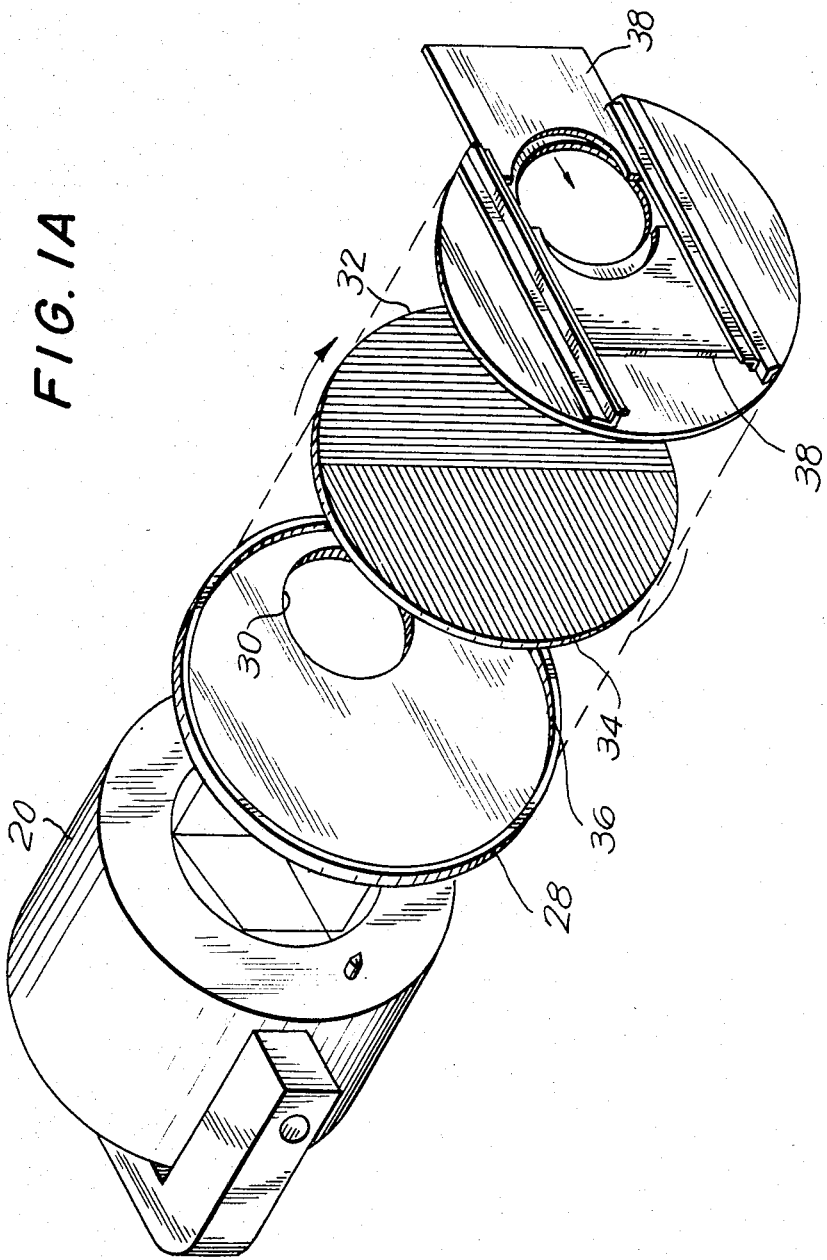

DUAL COLLIMATOR

BACKGROUND OF THE INVENTION

1. Field of the Invention

A dual collimator for beat-to-beat measurement of cardiac performance with an Anger camera.

2. Description of the Prior Art

A number of nuclear medicine methods are available for the evaluation of cardiac performance, but few are applicable to beat-to-beat studies. Multigated Anger-camera acquisition usually requires 2-7 minutes, limiting the temporal resolution of the measurement, see Borer J S, Bacharach S L, Green M V, et al: Real-time radionuclide cineangiography in the noninvasive evaluation of global and regional left ventricular function at rest and during exercise in patients with coronary artery disease, New Eng J Med 296:839-844, 1977; Pierson R N, Friedman M I, Tansey W A, et al: Cardiovascular nuclear medicine: an overview, Sem in Nucl Med 9:224-240, October 1979; and Brady T J, Thrall J H, Clare J M, et al: Exercise radionuclide ventriculography: practical considerations and sensitivity of coronary artery disease detection, Radiology 132:697-702, 1979.

Patients with atrial fibrillation or other cardiac arrythmias present timing problems in developing an accurate composite cardiac cycle. First-transit techniques require multiple injections if information is to be obtained for more than 4-7 cardiac cycles or during a prolonged observation period. The high count rates required by the first-transit technique are obtainable only on the multicrystal or the new "digital" camera, see Pierson R N et al cited supra, and see also Grenier R P, Bender M A, Jones R H: A computerized multicrystal scintillation gamma camera, In Instrumentation in Nuclear Medicine, Vol. 2, Hine G J and Sorenson J A, Ed., New York, Academic, 1974, pp 101-134; Genna S, Pang S, Smith A: Digital scintigraphy: principles, design and performance, J Nucl Med 22:365-371, 1981; Lewellen T K, Murano R: A comparison of count rate parameters in gamma cameras, J Nucl Med 22:161-168, 1981; Adams R, Hine G J, Zimmerman C D: Deadtime measurements in scintillation cameras under scatter conditions simulating quantitative nuclear cardiology, J Nucl Med, 19:538-544, 1978; and Perry J R, Johnston R E, Hodge J R, et al: Digital gamma camera performance characteristics, J Nucl Med, 22:P66, 1981 (abst).

The nonimaging probe can record ejection fraction, relative cardiac output, and stroke volume every 30 seconds and reportedly can monitor beat-to-beat changes, see Camargo E E, Harrison K S, Wagner H N, et al: Noninvasive beat-to-beat monitoring of left ventricular function by a nonimaging nuclear detector during premature ventricular contractions, Am J Cardiol 45:1219-1224, 1980; Berger H J, Davies R A, Batsford W P, et al: Beat-to-beat left ventricular performance assessed from the equilibrium cardiac blood pool using a computerized nuclear probe, Circ 63:133-142, 1981; and Bacharach S L, Green M V, Borer J S, et al; Beat-by-beat validation of ECG gating, J Nucl Med 21:307-313, 1980. However, accurate identification of the left ventricle with a nonimaging system is difficult in many patients and motion artifacts may limit the accuracy of such a technique for beat-to-beat measurements.

Among the prior art patents relative to collimators and special purpose cameras may be mentioned U.S. Pat. Nos. 3,011,057; 3,060,316; 3,238,371; 3,710,119; 4,027,167; 4,086,494; 4,118,632; 4,129,784; 4,200,803; 4,202,612; 4,221,971; 4,266,135; 4,266,139; 4,293,771; 4,324,979.

SUMMARY OF THE INVENTION

It is an object of the present invention to provide an improved dual collimator.

Another object is to provide a dual collimator for usage in conjunction with a single-crystal gamma camera (Anger camera).

An object is to provide a dual collimator-camera combination to permit measurement of cardiac performance on a beat-to-beat basis.

A further object is to measure cardiac performance on a beat-to-beat basis with a single-crystal gamma camera.

An additional object is to provide a dual collimator designed for beat-to-beat measurement of cardiac performance with an Anger camera.

Still another object is to provide a dual collimator having two sections and usable with a gamma camera, so that regions of interest of a subject can be delineated on multigated images of a first section, and so that the regions of interest can be transferred to high sensitivity images of a second section.

Still a further object is to provide a dual collimator that takes advantage of the resolution characteristics of an all-purpose collimator and the counting statistics of a high-sensitivity collimator to permit cardiac function analysis on a beat-to-beat basis with a gamma camera.

Still another object is to provide a dual collimator-camera combination which makes it possible to measure rapid changes in ejection fraction, stroke volume, relative end-diastolic and end-systolic volumes, and relative cardiac output, as well as monitoring cardiovascular changes during arrhythmias and during drug interventions.

An object is to provide a dual collimator-camera combination which has advantages for beat-to-beat monitoring of cardiac function over techniques using a non-imaging probe, in which the left ventricle must be localized in a blind manner as contrasted to the present combination in which the Anger camera's ability to locate the left ventricle represents a significant improvement for the monitoring of beat-to-beat phenomena.

These and other objects and advantages of the present invention will become evident from the description which follows.

BRIEF DESCRIPTION OF THE DRAWINGS

In the accompanying drawings in which is shown one of the various possible embodiments of the invention:

FIG. 1A is an exploded alternative embodiment. Note the off-center 14 cm. circular hole. Two hemi-circular sections, high sensitivity and high resolution, of a circular collimator are rotatable so that either section can be situated over the hole. As shown, these sections are juxtaposed hemi-circular halves of a circular collimator which revolves about a central pivot axis.

FIG. 2a shows the SAP section imaging two balloons, each 150 ml, separated by 12-mm plexiglass septum. Only a part of right balloon is visible through the aperture.

BRIEF DESCRIPTION OF THE INVENTION

The present dual collimator is preferably used in conjunction with an Anger camera, to permit measurement of cardiac performance on a beat-to-beat basis. Special all-purpose (SAP) and special high-sensitivity (SHS) collimator sections can be interchanged without movement of the patient. Thus, left-ventricular regions of interest delineated on SAP multgated images can be transferred to SHS high-sensitivity images to generate beat-to-beat volume curves. Preliminary balloon studies demonstrated an excellent correlation between ejection fractions calculated with the two collimators: $r > 0.99$, $n = 17$, $p < 0.001$. Varying the volume of an adjacent "right ventricle" balloon was intended to demonstrate any effect of SHS crosstalk data from the right ventricle on to the left ventricular area. This experiment showed no significant alteration of the count rate from the "left ventricle" balloon's region of interest. Preliminary results of 12 patients, comparing standard-camera ejection fractions with average beat-to-beat ejection fractions, showed that it is possible to measure cardiac function on a beat-to-beat basis with a single-crystal gamma camera. There was minimal difference between the ejection fractions calculated by the dual-collimator method and a standard gated technique ($r = 0.98$, $n = 12$, $p < 0.001$).

Figure 1:
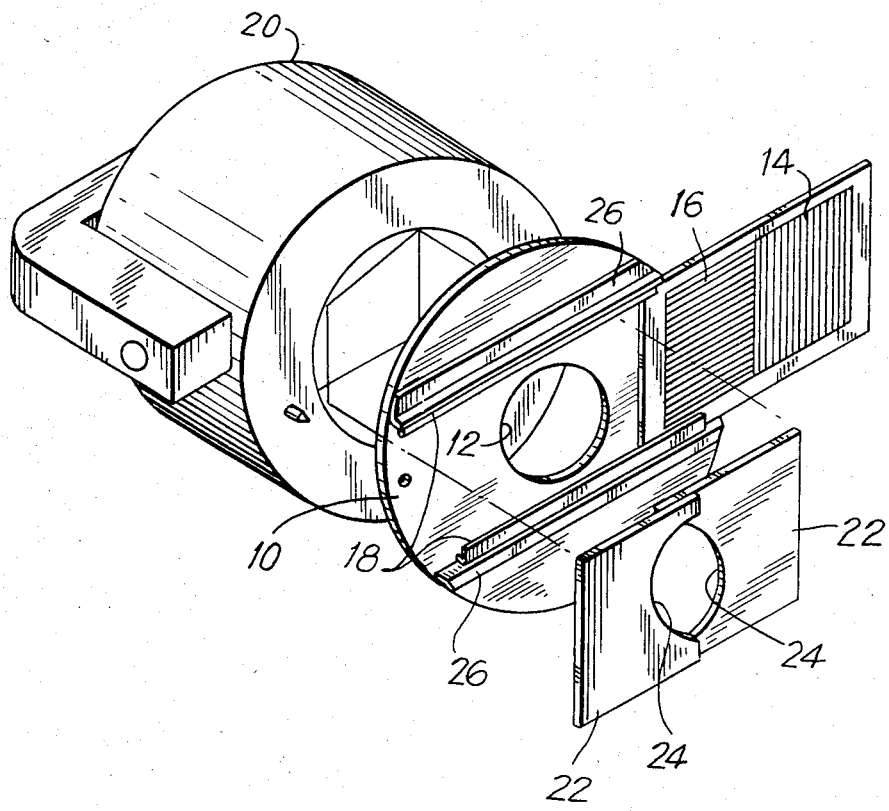
FIG. 1. is an exploded perspective view showing arrangements for sliding special collimators in front of a 14-cm hole in an aluminum-backed lead frame. Special all-purpose (SAP) section is to the left, special high-sensitivity (SHS) section to the right. An overlying pair of lead shutters can be adjusted to limit field of view to the left ventricle and a small adjacent background, minimizing dead-time effects. As shown, the SAP and SHS sections are rectangular and fused end-to-end.

In one embodiment (FIG. 1), the new collimator consists of a lead sheet 10, 3 mm thick, having a central, 14-cm circular hole 12. Two parallel-hole collimators are provided, a special high-sensitivity one 14 (SHS) and a special all-purpose one 16 (SAP); they are fused end-to-end so that they can slide in aluminum tracks 18, placing either one over the large hole 12 without requiring movement of either the patient or the camera's detector 20. Thus, a region of interest drawn on an image made with the all-purpose collimator can be transferred directly to a high-count image made with the SHS collimator. Just overlying the collimators is a pair of lead shutters 22 with semicircular inner edges 24; they slide in another aluminum track 26 and serve to limit the camera's field of view to the left ventricle and a small part of surrounding background. An alternative embodiment FIG. 1A employs a lead sheet 28 3 mm thick with an off centered 14 cm. circular hole 30. The high sensitivity 32 and high resolution 34 parallel hole collimators are each hemi-circular and fused together making a circle. Placed in a circular guide 36 they can be rotated such that either section can be situated over the hole 30. The lead slides 38 operate as in the first embodiment. Examples of the characteristics of these collimators are shown in Table 1. The SAP section provides sensitivity and resolution similar to those of a typical all-purpose collimator, while the SHS section has a sensitivity approximately seven times that of a typical high-sensitivity collimator. A key point of the invention is that the one type (SAP) is used first, to get a defined area (high definition); and then the other one (SHS) is actually used to do the study of the human heart.

The results of this invention and study demonstrate that it is possible to monitor cardiac function accurately on a beat-to-beat basis with an Anger camera. Routine multgated blood-pool studies requires about 4–10 million counts over the total field of view for adequate delineation of the end-diastolic and end-systolic left-ventricular borders. However, once the border has been outlined, volume changes can be monitored with substantially fewer counts per frame. Our approach uses a dual collimator to obtain first the higher-resolution image necessary for proper heart-border delineation, followed by lower-resolution images with the high count rate necessary for beat-to-beat statistics.

The SHS collimator was designed to permit statistically significant beat-to-beat measurements without incurring appreciable dead-time losses. This requires the use of the sliding lead aperture to eliminate counts from areas outside the left heart except for a small region of adjacent background. To achieve similar left-ventricular statistics with a traditional 25-cm collimator would necessitate accepting count rates of more than 200,000 cps. This is beyond the capability of all but the multicrystal camera or possibly one of the new "digital" cameras.

Although a significantly larger penumbral region is produced in the lower-resolution image, the correctly-sized region of interest from the higher-resolution image limits the high-sensitivity field of view to counts from within the true ventricular border. The increased count rate is almost entirely due to an increase in sensitivity within the region of interest, and only a small component will come from the background outside this area. The background region of interest serves to measure this increase in background counts when collimators are shifted, and is chosen far enough from the ventricular border to be outside the penumbral region of the ventricle.

Figure 2A:
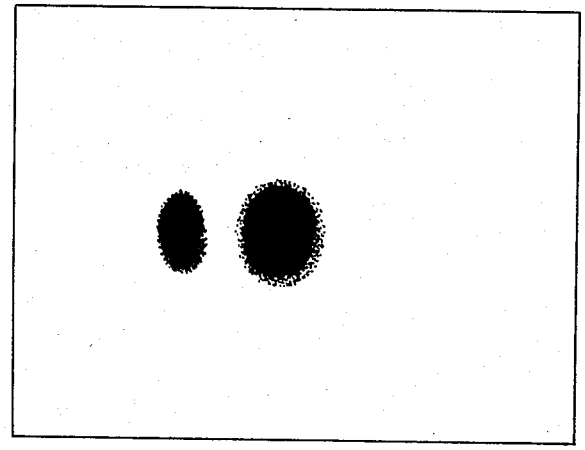
FIGS. 2a and b. show typical images obtained with special collimators.
Figure 2B:
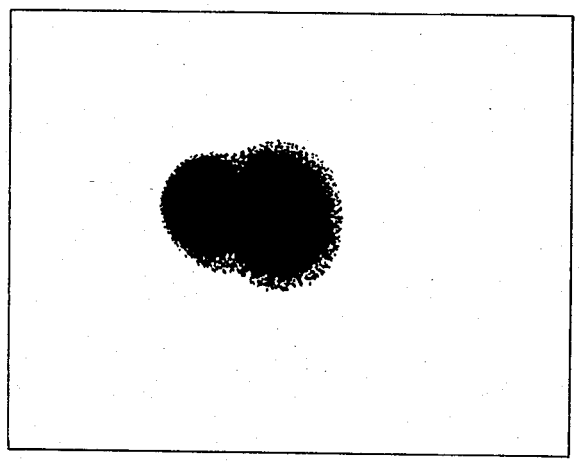
FIG. 2b shows the same, using SHS section.

As shown in FIG. 2, counts from a RV balloon overlap into the photon-deficient 12-mm septal region and spill into the LV balloon region to some extent. Note, however, that the increased septal activity is due to contributions from both balloons, and therefore any visual appearance of significant RV overlap into the septal area may be misleading. Comparison of counts from the high-sensitivity images of a 100-ml LV balloon (using the higher-resolution RO1) while the RV balloon simulated a 67% ejection fraction (50 to 150 ml) resulted in no appreciable change in the LV balloon count rate.

This invention has advantages for beat-to-beat monitoring of cardiac function over techniques using a non-imaging probe. With such a probe, the left ventricle must be localized in a blind manner making localization, as well as subsequent repositioning, an uncertain and time-consuming procedure. In addition, artifacts from patient motion and the possible inclusion of right-heart activity must be considered potential problems. Thus, the Anger camera's ability to locate the left ventricle represent a significant improvement for the monitoring of beat-to-beat phenomena.

Although this system does not permit visualization of wall motion in the beat-to-beat mode, that information is available from the initial multigated study. In the beat-to-beat mode, however, we can measure rapid changes in ejection fraction, stroke volume, relative end-diastolic and end-systolic volumes, and relative cardiac output, which were not previously obtainable on a beat-to-beat basis with a gamma camera. Possible applications of this technique include monitoring cardiovascular changes during arrhythmias and during drug interventions.

The present dual collimator-camera development basically is a dual collimator operatively associated with a gamma camera, the collimator comprising a pair of parallel-hole collimators. Shutters limit the field of vision of the camera. One parallel-hole collimator is designed for special high-sensitivity performance (SHS), while the other parallel-hole collimator is a special all-purpose (SAP) one. The SHS section provides a sensitivity several times greater than the SAP section. The collimator utilizes both the enhanced resolution characteristics of the SAP collimator, which is employed first, and the counting statistics attributable to the SHS collimator, to permit cardiac function analysis on a beat-to-beat basis with a gamma camera. In other words, a key point to the invention is that one collimator type (SAP) is used first to get a defined area (high definition), and then the other collimator (SHS) is used to acquire high count rate data, all in conjunction with the gamma camera.

To summarize, the present dual collimator basically includes a special all-purpose collimator section (SAP) having good image resolution characteristics similar to prior art collimators, a special high-sensitivity collimator section (SHS) for high counting statistics image, and a camera means, the camera means cooperating in conjunction with the SAP and SHS sections. Means is provided to interchange the SAP and SHS sections, relative to the camera means, so that the camera means remains stationary relative to a subject, and so that the SAP and SHS sections are interchangeable without moving the gamma camera or subject. Means is provided to delineate regions of interest of the subject on images of the SAP section, and means is provided to transfer these regions of interest to high sensitivity images of the SHS section.

Typically, the dual collimator is utilized so that the means to delineate regions of interest is employed first to obtain a defined area of high definition, followed by usage of the transfer means to study high count rate data within the regions of interest. In a preferred embodiment, the regions of interest include the heart of a human subject, and the study of regions of interest includes measurement of cardiac function on a beat-to-beat basis. In this embodiment, generally cardiac function is measured with a single-crystal gamma camera, e.g. an Anger camera, by transferring left ventricular regions of interest delineated on multigated images of the SAP section to high sensitivity images of the SHS section. Thus, the system and invention generates beat-to-beat volume curves to measure cardiac function on a beat-to-beat basis.

The invention accordingly consists in the features of construction, combination of elements, and arrangements of parts which will be exemplified in the device and apparatus hereinafter described, and of which the scope of application is as elucidated supra and as will be indicated in the appended claims.

DETAILED DESCRIPTION OF THE PREFERRED EMBODIMENTS

The technique and method employed in the usage of the present dual collimator-camera combination will now be described.

Using the SHS collimator with a 10 cm aperture and a 25-mCi patient dose of Tc-99m-labelled RBC's, observed patient count rates are on the order of 45–55,000 cps. For the camera used in the patient studies, a measured count rate of 50,000 cps produced a dead-time loss (with 5 cm of plexiglass for scatter) of about 23%.

Preliminary validation experiments used a balloon to simulate the left ventricle. The balloon was immersed in an 8-L water phantom such that the center of the balloon was 7 cm from the face of the collimator. The balloon was filled to a volume of 80 ml with a solution containing 1c-99m at 4.4 mCil, and activity was added to the surrounding water to achieve a balloon-to-background ratio of approximately 3:1. These activity levels were selected to that dead-time effects would be minimized, with count rates ranging from 1,000 to 15,000 cps, depending on collimator type. Commercial units were used for data acquisition and processing. Images were obtained in a 128×128 matrix with the balloon filled to 40, 60, 80, 100, 120, 140, and 160 ml. At each volume, images were obtained with the SAP and SHS collimators, moving only the collimators. Images from each volume were analyzed by drawing manually a region of interest (ROI) around the balloon border on the high-resolution (SAP) image. A background region of interest was similarly created eight pixels away from the outer edge of the balloon. These regions of interest were then superimposed on the high-sensitivity image obtained with the SHS collimator. Thus for each balloon volume, two background-corrected count rates were obtained, one for the SAP and one for the SHS image.

To simulate the effects of right-heart activity on the left ventricle, a second (right) balloon was introduced beside the "left" balloon, separated by a 12-mm Plexiglas sheet. While the volume of the left balloon was kept constant at 100 ml, SAP and SHS images were obtained with the right balloon filled with 50, 100, and 150 ml of the same radioactive solution. Typical images produced by the two collimators are shown in FIG. 2. A left-balloon region of interest was generated from the SAP image. This region was then transferred to the SHS images to examine changes in the left balloon's count rate as a function of activity in the right balloon.

Preliminary data have been obtained from 12 patients undergoing standard tests for resting ejection fraction and wall motion. Following the routine patient study, the normal collimator was replaced with the dual collimator. The patient was repositioned for an LAO projection using the SAP section, and a multigated study was performed. The sliding lead aperture was then adjusted to include only the left ventricle and some adjacent background, and the collimator was switched to the SHS section. Additional images were then obtained at the rate of 20 frames per sec. in 32×32 "zoom" mode. Left-ventricular regions of interest were drawn using both the end-diastolic and end-systolic frames from the higher-resolution image, and a background region was drawn on the end-diastolic frame. These three regions of interest were then transferred to the high-sensitivity images for beat-to-beat processing.

TABLE 1

EXAMPLE OF DUAL-COLLIMATOR CHARACTERISTICS

|  | SHS | SAP |
|---|---|---|
| Thickness | 2.5 cm | 2.5 cm |
| Hole shape | hex | hex |
| Septum thickness | 0.25 mm | 0.25 mm |
| Effective hole diameter | 5.5 mm | 1.75 mm |
| Collimator size* | 15 × 15 cm | 15 × 15 cm |
| Sensitivity (30% window) | 125,000 cps/mCi | 7800 cps/mCi |
| Resolution (FWHM) |  |  |
| at 0 cm | 9 mm | 6 mm |
| at 5 cm (in air) | 16 mm | 9 mm |

*Can be reduced with variable lead aperture.

TABLE 2

COMPARISON OF STANDARD-CAMERA EJECTION FRACTIONS WITH AVERAGE BEAT-TO-BEAT EJECTION FRACTIONS FOR TWELVE PATIENTS

| Patient | Beat-to-Beat | | | Standard EF SAP Collim. | EF difference: standard-- beat-to-beat |
|---|---|---|---|---|---|
|  | EF Avg | No. of beats | Std. dev. EF units |  |  |
| 1 | 59.6 | 40 | 2.6 | 60.9 | 1.3 |
| 2 | 43.5 | 55 | 3.9 | 44.0 | 0.5 |
| 3 | 71.5 | 61 | 3.1 | 70.3 | −1.2 |
| 4 | 28.9 | 42 | 1.6 | 31.0 | 2.1 |
| 5 | 54.0 | 63 | 3.6 | 58.5 | 4.5 |
| 6 | 52.7 | 47 | 4.0 | 59.0 | 6.3 |
| 7 | 27.7 | 64 | 2.9 | 30.0 | 2.3 |
| 8 | 54.4 | 42 | 2.6 | 63.0 | 8.6 |
| 9 | 58.3 | 59 | 3.4 | 62.6 | 4.3 |
| 10 | 41.8 | 44 | 5.3 | 43.0 | 1.2 |
| 11 | 79.0 | 69 | 5.0 | 80.0 | 1.0 |
| 12 | 72.5 | 85 | 4.1 | 71.0 | −1.5 |

Using a region of interest drawn around the balloon border on the SAP image, linearity of balloon count rate versus balloon volume was confirmed for both the SAP and the SHS collimator sections ($r > 0.99$, $n = 7$, $p < 0.001$ for each collimator section).

Figure 3:
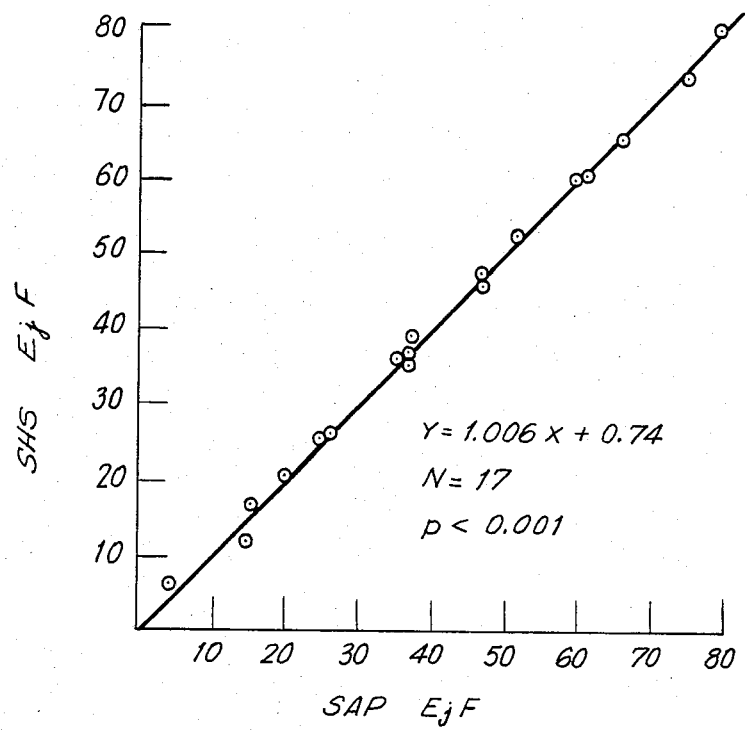
FIG. 3. is a comparison of ejection-fraction determination with SAP and SHS collimators using count rates for various combinations of balloon volume.
Figure 5:
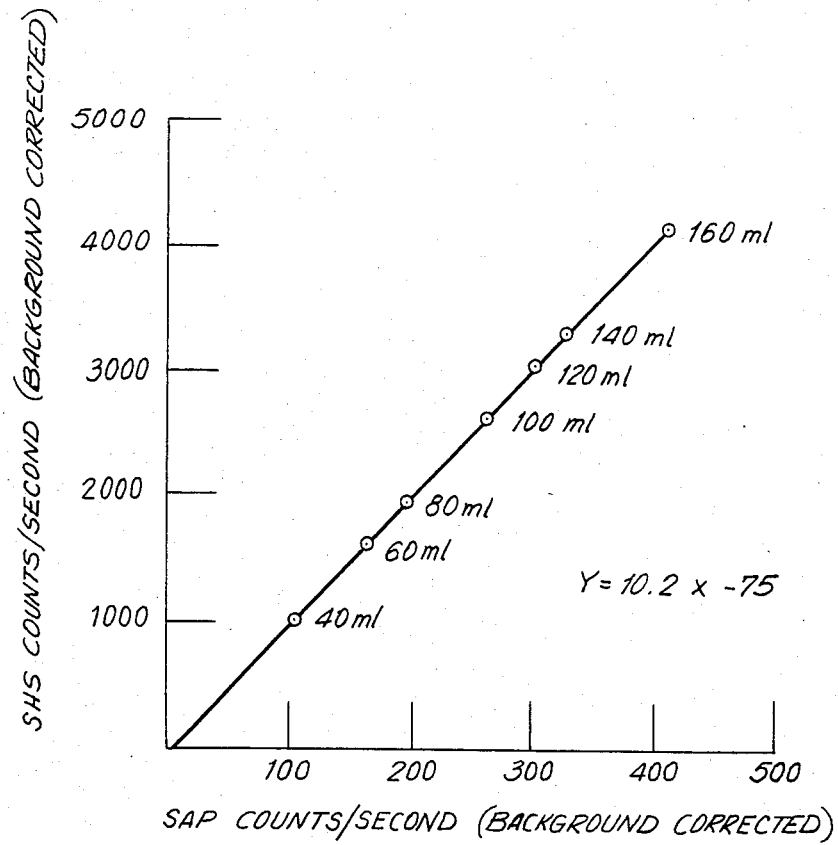
FIG. 5. Shows the straight-line correlation of SHS counts per second with SAP counts per second.

Ejection fractions were calculated from count rates for all possible combinations of balloon volumes and are compared for the two special collimators in FIG. 3. The data show a correlation coefficient of $r > 0.99$, $r = 17$, $p < 0.001$.

The effect of varying the volume of a right-heart balloon on the measured left-balloon activity was examined as described in the previous section. No appreciable change in the left-balloon count rate was observed.

Figure 4:
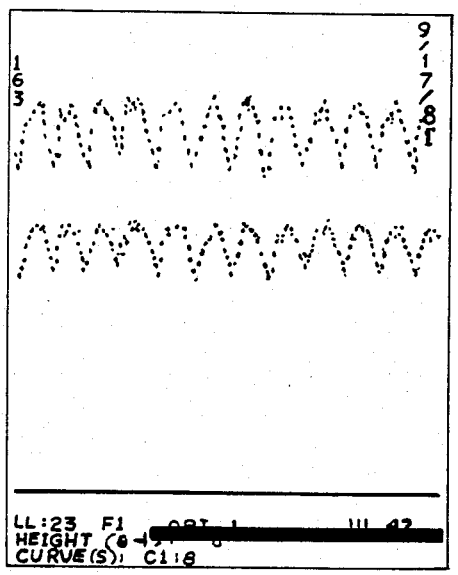
FIG. 4. shows left-ventricular beat-to-beat volume curves from a patient study acquired with SHS collimator. Upper curve acquired using fixed region-of-interest (ROI) around the end-diastolic image; lower curve from end-systolic ROI. Ejection fractions are calculated from peaks of end-diastolic curve and troughs of end-systolic curve.

Beat-to-beat left-ventricular volume curves for a typical patient study are shown in FIG. 4. Data were acquired with the SHS collimator. Table 2 lists the values for the standard-camera ejection fraction and average beat-to-beat ejection fraction for 12 patients. Linear regression analysis confirms a highly significant correlation ($y = 1.02x - 3.2$, $r = 0.98$, $p < 0.001$).

It thus will be seen that there is provided a dual collimator-camera combination which achieves the various objects of the invention, and which is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby, since the embodiments of the invention particularly disclosed and described herein above are presented merely as an example of the invention. Other embodiments, forms, and modifications of the invention, coming within the proper scope and spirit of the appended claims, will of course readily suggest themselves to those skilled in the art. Thus, while there has been described what is at present considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. Apparatus for use with a gamma camera for permitting first the identification of an anatomical area of interest and then the study of the identified area without requiring movement of either the camera or the identified area, comprising a first high resolution collimator section for identifying an area of interest, a second high sensitivity collimator section for study of the identified area, the first and second collimator sections joined to each other at one end, means located between the camera and the area of interest for permitting communication of the camera with the area of interest, including means for receiving the joined first and second collimator sections and for permitting sliding movement of the joined sections to permit positioning of either the first or the second collimator section between the camera and the area of interest thereby allowing first the identification of the area of interest and then the study of the identified area without requiring movement of either the camera or the identified area.

2. Apparatus for use with a gamma camera for permitting the identification of an anatomical area of interest and the study of the identified area without requiring movement of either the camera or the identified area, comprising a first high resolution collimator section for identifying an area of interest, a second high sensitivity collimator section for study of the identified area, the first and second collimator sections joined to each other at one end, a lead sheet disposed between the camera and the area of interest including an opening to permit communication of the camera with the area of interest and including means for receiving the joined first and second collimator sections and for permitting sliding movement of the joined sections to permit positioning of either the first or the second collimator section in front of the opening and therefore between the camera and the area of interest thereby allowing first the identification of the area of interest and then the study of the identified area without requiring movement of either the camera or the identified area.

3. Apparatus as in claim 2 which further comprises a pair of lead shutters disposed between the camera and the area of interest, the shutters being movable to limit the camera's field of view to the area of interest.

4. Apparatus as in claim 3 in which the hole in the lead sheet is at a location which is off center and the first and second collimator sections are hemi-circular in shape and joined together forming a circular shaped disc, means mounting the disc on the lead sheet for rotary movement to permit positioning of either the first or second collimator section in front of the opening and therefore between the camera and the area of interest thereby allowing first the identification of the area of interest and then the study of the identified area without requiring movement of either the camera or the identified area.

* * * * *